United States Patent [19]

Babb et al.

[11] Patent Number: 5,406,808
[45] Date of Patent: Apr. 18, 1995

[54] TWO-LITER BOTTLE COOLER/INSULATOR

[76] Inventors: Alvin A. Babb, 106 Walnut St., Smyrna, Tenn. 37167; Don R. Babb, 4333 Bell La., Milton, Fla. 32571

[21] Appl. No.: 178,922

[22] Filed: Jan. 7, 1994

[51] Int. Cl.$^6$ .......................... B67D 5/62; A47J 41/00
[52] U.S. Cl. .................................. 62/457.4; 62/371; 220/379; 220/739; 220/740
[58] Field of Search ................ 62/457.1, 457.2, 457.4, 62/529, 530, 371, 372, 389, 400; 220/379, 705, 710.5, 739, 740, 744, 761, 903

[56] References Cited

U.S. PATENT DOCUMENTS

| | | | |
|---|---|---|---|
| 1,607,774 | 11/1926 | Morse | 220/744 |
| 3,998,445 | 12/1976 | Huskins | 62/371 |
| 4,324,111 | 4/1982 | Edwards | 62/457 |
| 4,600,111 | 7/1986 | Brown | 220/703 |
| 4,747,274 | 5/1988 | Duemmig-Zitzmann | 62/371 |
| 4,798,063 | 1/1989 | Rimmer | 62/457 |
| 4,811,858 | 3/1989 | Augur | 220/903 X |
| 4,961,324 | 10/1990 | Allan | 62/400 |
| 5,001,907 | 3/1991 | LaCroix et al. | 62/457 |
| 5,243,835 | 9/1993 | Padamsee | 62/457.2 |
| 5,244,106 | 9/1993 | Takacs | 220/740 X |

FOREIGN PATENT DOCUMENTS 623865  5/1949  United Kingdom ................ 220/379

*Primary Examiner*—Henry A. Bennet
*Assistant Examiner*—William C. Doerrler
*Attorney, Agent, or Firm*—Waddey & Patterson; I. C. Waddey, Jr.

[57] ABSTRACT

My two-liter bottle cooler includes a container and a lid. The container has a chamber with an enclosed bottom and an open top. The container has multiple walls displaced from each other creating annular pockets. The annular pocket that is nearest the chamber is filled with a freeze gel and the outer annular pocket is filled with an insulating foam. The open top of the container has external threads and the mouth of the lid is internally threaded with mating threads. The lid can be screwed onto the container to hold a two-liter bottle in place within the chamber. The dome of the lid has a hole with the neck of the two-liter bottle passing through the hole so that beverage contained within the two-liter bottle can be poured directly from the bottle as it is held in the cooler. The hole in the dome is internally threaded so that the cooler can also function as a container without an inserted two-liter bottle. In the latter case, a pour spout is provided with a threaded plug and a spout. The threaded plug mates with the internal threading in the hole of the dome to close the dome. The spout is externally threaded and a two-liter bottle cap can be threaded onto the spout to close it. When the pour spout is not in use, it can be stored in a pocket in the handle in the cooler. The pocket is internally threaded to mate with the external threads on the spout. The bottle cap is fitted within the opening contained in the threaded plug and a cover is fitted over the plug to seal it against outside elements. The cover can be internally threaded to mate with the external threads on the plug. When the plug is in use, the cover can be stored by threading it onto an externally threaded stump contained on the bottom of the handle of the cooler.

14 Claims, 2 Drawing Sheets

TWO-LITER BOTTLE COOLER/INSULATOR

BACKGROUND OF THE INVENTION

The present invention relates generally to a device for cooling and insulating from change the temperature of the contents of a bottle, and in the preferred embodiment, a two-liter soft drink bottle. The present invention relates more particularly to a device that is designed to receive a two-liter bottle and insulate its contents from temperature change because of the differences between the temperature of the contents of the bottle and the outside temperature, as well as cool the contents of the bottle when desired. In addition, the device of the present invention is designed to be filled with liquid independent of a soft drink bottle and to maintain and cool the temperature of the liquid within the container even though the outside temperature may be greater than the desired temperature of the contents of the container.

It will be appreciated by those skilled in the art that insulated containers are readily available in the market place, beginning with the production of the original thermos bottles and improvements on that concept that have been developed over the years. The so-called "thermos" bottles is an insulated container which will maintain the temperature of either hot or cold liquid, soups, and the like that are stored in the container.

In addition to the traditional "thermos" bottles that are available in the market place, insulating containers are well known from the simplest devices such as the well known foam cup into which are inserted beer and soft drink cans to insulate the hand of the holder from the cold of the beer can or soft drink and to insulate the contents of the beer can or soft drink container against increases in temperature because of the surrounding heat. More sophisticated devices include containers with cavity walls including freeze gel compounds that can be frozen and are used to maintain the temperature of the container inserted within the insulating device.

While the devices known in the prior art have proven to be useful, the prior art devices are lacking in several respects. More specifically, the prior art devices fail to provide a structure for adequately maintaining the cool temperature of a soft drink container and which will even reduce the temperature of the contents of a soft drink container on a hot day, which allow for ready removal of the soft drink container from the structure and its conversion to a container for liquids, such as ice tea, kool-aid, lemonade and the like which are not generally available in bottled containers as are soft drinks. Ice tea, kool-aid and the like are generally mixed and placed in a container for transportation to be drank at a remote location. The present invention provides a convertible structure which can be used for both liquids that have their own container and for liquids which are mixed separately without their separate container. The present invention further facilitates the retention of the caps associated with a closed container and provide the means to maintain the cleanliness of the closed container. Such a device is presently lacking in the prior art.

SUMMARY OF THE INVENTION

My two-liter bottle cooler includes a container and a lid. The container has a chamber with an enclosed bottom and an open top. The container has multiple walls displaced from each other creating annular pockets. The annular pocket that is nearest the chamber is filled with a freeze gel and the outer annular pocket is filled with an insulating foam. The open top of the container has external threads and the mouth of the lid is internally threaded with mating threads. The lid can be screwed onto the container to hold a two-liter bottle in place within the chamber. The dome of the lid has a hole with the neck of the two-liter bottle passing through the hole so that beverage contained within the two-liter bottle can be poured directly from the bottle as it is held in the cooler. The hole in the dome is internally threaded so that the cooler can also function as a container without an inserted two-liter bottle. In the latter case, a pour spout is provided with a threaded plug and a spout. The threaded plug mates with the internal threading in the hole of the dome to close the dome. The spout is externally threaded and a two-liter bottle cap can be threaded onto the spout to close it. When the pour spout is not in use, it can be stored in a pocket in the handle in the cooler. The pocket is internally threaded to mate with the external threads on the spout. The bottle cap is fitted within the opening contained in the threaded plug and a cover is fitted over the plug to seal it against outside elements. The cover can be internally threaded to mate with the external threads on the plug. When the plug is in use, the cover can be stored by threading it onto an externally threaded stump contained on the bottom of the handle of the cooler.

In use, the cooler with the freeze gel will be placed in a freezer to lower the temperature of the freeze gel to freezing or below temperature. When one desires to use the cooler, it is removed from the freezer and a two-liter container is inserted into the chamber of the container. The lid is then screwed onto the lip of the container over the two-liter bottle with the neck of the two-liter bottle extending through the hole in the dome of the lid. The freeze gel will keep the contents of the two-liter bottle cool and will in fact reduce the temperature of the contents of the bottle if the contents are above the freeze range of liquid. The foam in the outer annular pocket will insulate the freeze gel from outside elements which will keep the freeze gel cool, which will, in turn, cool the contents of the two-liter bottle. The cooler of my invention is functional when the contents are poured directly into the chamber of the container without having them packaged in a two-liter bottle. In those occasions, the spout is inserted in the hole in the dome and a cap threaded onto the spout to preserve the contents within the chamber. The same ultimate results of maintaining the temperature of the contents within the chamber is achieved.

DESCRIPTION OF THE PREFERRED EMBODIMENT

My two-liter bottle cooler/insulator was initially conceived to meet the needs of automobile racing fans. However, it certainly meets the needs of the consumer in a variety of instances. Thus, my cooler can be used not only by automobile racing fans but by others engaged in and participating as a fan in all extended outdoor activities, particularly those engaged in primarily during the summer seasons when the participant is exposed to extreme heats, possible dehydration and the need for significant fluid intakes over an extended period of time. For example, fans at automobile races, horse races, outdoor concerts, amateur baseball and softball games, professional golfing events and the like often want to carry to the events their own soft drinks, ice tea, lemonade or water. Similarly, on long motoring trips, families often want to pack soft drinks, ice tea or water to avoid having to stop and delay their trip every time someone in the group get thirsty.

Most of the events for which my cooler would be most appropriate are those extended events which may involve a full day's activities or participation and most often involve events taking place during the heat of the summer. In those instances, the tans and participants often plan to stop at a convenient store and purchase a large container filled soft drink or the like. A standard size of container for soft drinks is the two-liter bottle. Thus, one specific design of my invention is adapted to accommodate a two-liter bottle, although it will be appreciated by those of skill in the art that the invention is adapted to smaller or larger containers. In this description of the preferred embodiment of the invention, I will describe it in the context of a cooler/insulator for a two-liter bottle of beverage although it is understood that the cooler/insulator could be adapted to accommodate different sized bottles.

Because some consumers would prefer to drink ice tea, lemonade or water at the kinds of events described above, and because those beverages are not as readily available for bottled distribution, the consumer may want to prepare the liquid and pour it directly into a cooler/insulator. Therefore, the present invention is adapted to accommodate both beverages that are regularly sold in large bottles and those beverages that are mixed or prepared independently or to be transported directly in the cooler/insulator.

Figure 1:
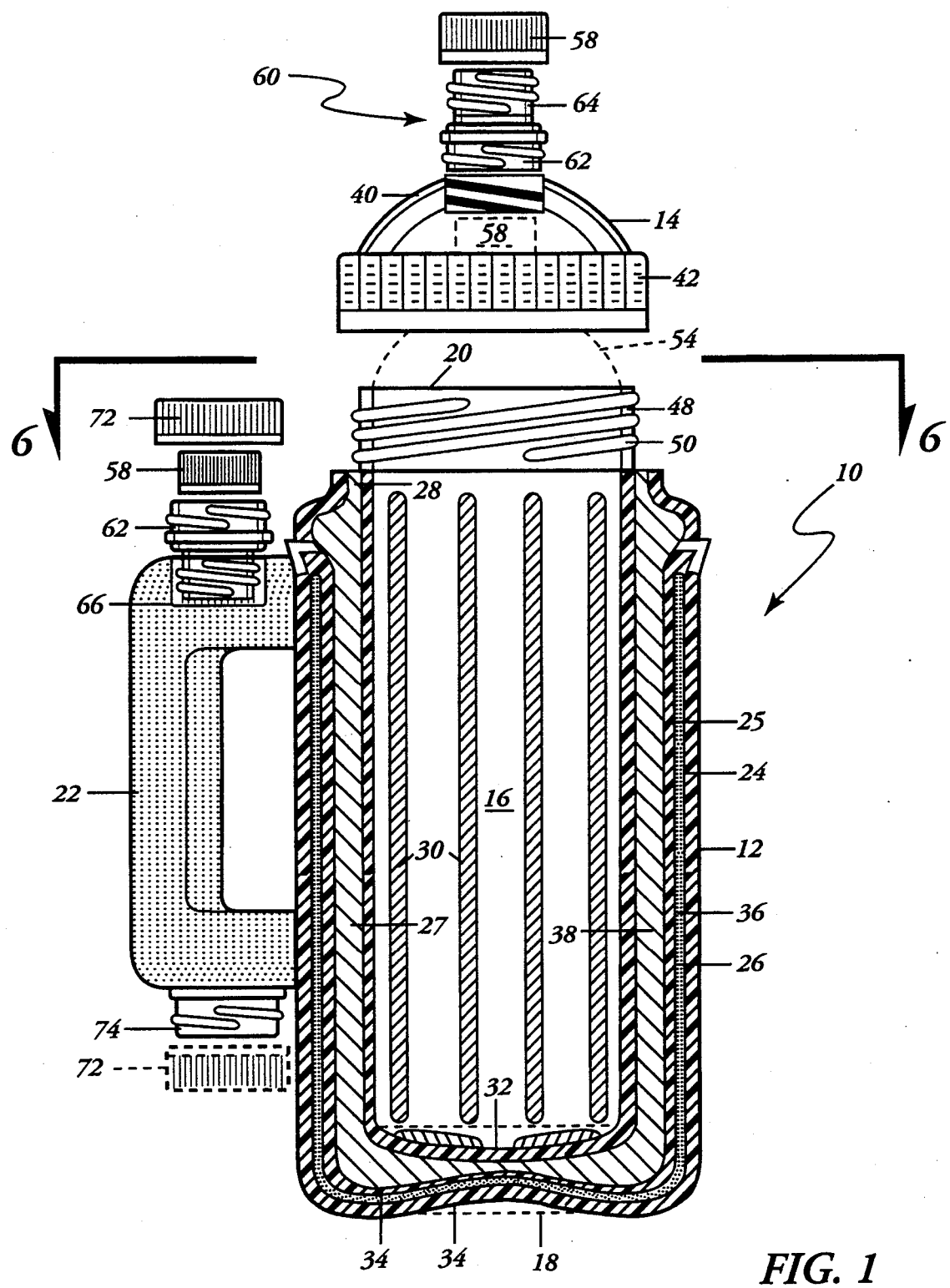
FIG. 1 shows the cooler of my invention with the chamber of the container in cross-section and a portion of the lid in cross-section.

Referring to FIG. 1, the cooler of my invention is shown in an exploded cross-sectional view. My invention is shown generally as cooler 10 with container 12 and lid 14. The container 12 has a chamber 16 with a sealed bottom 18 and an open top 20. Handle 22 is fixed to the side of the container 12.

The container 12 is structured of a synthetic rubber or plastic material and includes an outer wall 24, an inner wall 28 and a divider wall 26. The walls 24, 26, 28 are generally cylindrical in shape with each having an integral bottom to close one end of the cylinder. The walls are spaced from each other such that the outer wall 24 and the divider 26 create an outer annular pocket 25. Similarily, the spacing between the inner wall 28 and the divider wall 26 create an inner annular pocket 27. The inner annular pocket 27 is filled with a freeze gel 38 readily and commercially available, such as the freeze gel 38 manufactured by Rubbermaid, Incorporated, Specialty Products Division, Wooster, Ohio 44691 and sold under the name "BLUEICE". The outer annular pocket 25 is filled with an insulating foam 36. In the preferred embodiment, the thickness of the inner annular pocket 27 is $\frac{1}{2}''-\frac{3}{4}''$ and the thickness of the outer annular pocket 25 is $\frac{1}{4}''-\frac{1}{2}''$.

Inside the chamber of the container are ribs 30 which extend radially into the chamber and longitudinally in the direction of the axis of the chamber.

The inner wall 28 has a concave bottom 32 integral with it and the outer wall 24 and the divider wall 26 have convex bottoms 34, 34' respectively to add strength to the container. The spacing between the convex bottoms 34, 34' is essentially the same as the spacing between the divider wall 26 and the outer wall 24. The spacing between the convex bottom 24 and the concave bottom 32 varies, from a spacing equal to the spacing between the divider wall 26 and inner wall 28 and a reduced spacing as a result of the facing of the convex/concave shapes.

The lid 14 includes a dome 40 and rim 42. A hole 44 is created in the apex of the dome 40. The lid has a mouth 46 and the container includes an annular lip 48 formed by the extension of the inner wall 28 above the height of the outer wall 24. External threads 50 are formed on the lip 48 and internal threads 52 are formed inside the rim 42 of the lid. Threads 50 and 52 mate and the shape of the rim 42 of the lid 14 compliments the shape of the lip 48 of the container 12 so that when the lid is screwed onto the container, a liquid tight chamber is created. The chamber 16 within the container 12 is adapted to receive and fit tightly about an industry standard bottle. In this particular preferred embodiment, the industry standard bottle is a two-liter soft drink bottle, but the shape of the chamber can be designed to fit any industry standard or atypical bottle shape or size.

A bottle is shown in phantom line 54 as seated within the chamber 16. When a bottle 54 is placed in the chamber 16, the lid 14 is placed over the top of the bottle and screwed onto the lip 48. The lid 14 fits tightly about the top of the bottle 54 and the dome 40 of the lid 14 holds the bottle 54 in place. The neck of the bottle extends through hole 44 and bottle cap 58 is screwed onto the spout of the bottle 54.

Assuming that the soft drink or other liquid contained within the bottle 54 is cool or cold when it is inserted into the cooler/insulator of this invention, and assuming further that the cooler/insulator of this invention has been previously stored in a freezer and the freeze gel chilled to a freezing temperature, the cooler/insulator will maintain the temperature of the soft drink or beverage carried in the cooler/insulator and on many occasions will actually reduce the temperature of the beverage. The beverage will be maintained at its selected temperature for an extended period of time and tests have shown that over periods of up to six hours, the temperature of the beverage within the container, even on hot summer days, will rise only a few degrees.

Figure 2:
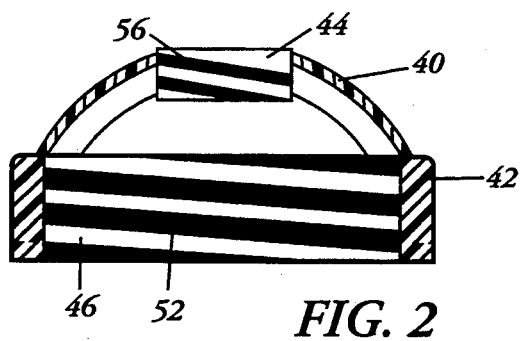
FIG. 2 shows the lid in cross-section.
Figure 3:
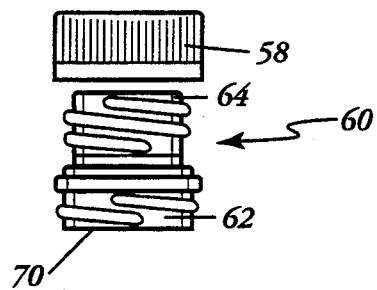
FIG. 3 shows a side view of the pour spout and bottle cap.

As can be seen from FIG. 2, the opening 44 of lid 14 is internally threaded with internal threads 56. If one desires to store in the cooler/insulator of this invention a beverage that is not contained in a separate bottle, the beverage can be poured into the chamber 16 either with the lid 14 screwed onto the lip 48 and in place by pouring the beverage through hole 44 or, if the beverage is only filled to the top of the chamber 16, it can be poured into the open top 24 of the container and the lid 14 then screwed onto the lip 48 of the container. Once the beverage is poured into the chamber 16, the container is sealed by screwing into the opening 44 the pour spout 60 shown in FIG. 3. The pour spout 60 includes a threaded plug 62 and a spout 64. The threaded plug 62 has external threads that mate with the internal threads 56 of hole 44. A channel passes through the pour spout 60 so that the beverage within the chamber 16 of the container 12 can be poured through the pour spout 60. To seal the pour spout 60, spout 64 has external threads which mate with the internal threads of bottle cap 58. The bottle cap 58 can thus be screwed onto the external threads of the spout 64 to seal the container.

When the pour spout 60 is not in use, it can be stored in the pocket 66 contained in the upper portion of the handle 22 of the container. The pocket 66 is a counterbore into the mass of the handle 22 and has internal threads which mate with the external threads of the spout 64.

Figure 4:
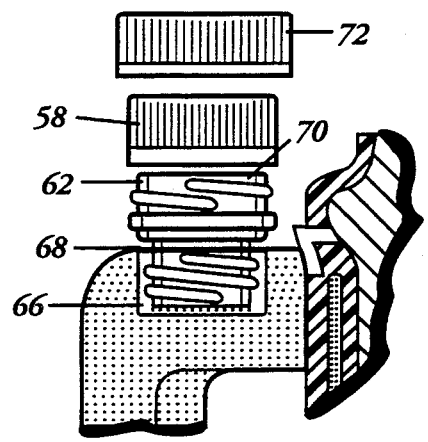
FIG. 4 shows an exploded view of the storage pocket for the pour spout.

Pocket 66 is shown in FIG. 4 with the internal threads 68 and the pour spout 60 screwed into the pocket. The external threads on the spout 64 mate with the internal threads of the pocket 66. When assembled in this manner, the threaded plug 62 extends above the handle and bottle cap 58 can be fitted within the open channel passing through the threaded plug 62. To retain the bottle cap 58 within the chamber of the threaded plug 62, a cover 72 is provided. The cover 72 may be tightly fitted about the perimeter of the threaded spout 62 or it may be internally threaded so that it can be screwed onto the external threads of plug 62 to hold the bottle cap 58 into place and to seal the pour spout 60 to prevent its exposure to the external elements. This is particularly advantageous when the device of the present invention is used in sporting events that are conducted outside where dust, dirt and grime are present. By sealing the pour spout in this manner, it will remain clean even when it is not in use.

After the user of this invention has drunk all of the beverage contained in bottle 54, he can remove the bottle 54, dispose of it and fill the chamber 16 with water or other unbottled beverage, unscrew the cover 72 from the threaded plug 62 and insert the threaded plug 62 into the threaded opening 44 in the dome 40 of the lid 14. The cap 58 is first removed from the passage 70 through the pour spout and once the pour spout is in place in the lid, the bottle cap 58 can be screwed onto the externally threaded spout 64.

In order to maintain the cleanliness of the cover 72, a stump 74 is provided at the bottom of the handle 22. The stump 74 is externally threaded to mate with the internal threads on the cover 72 so that the cover 72 may be screwed onto the stump 74 in a seal type arrangement to maintain its cleanliness.

Figure 6:
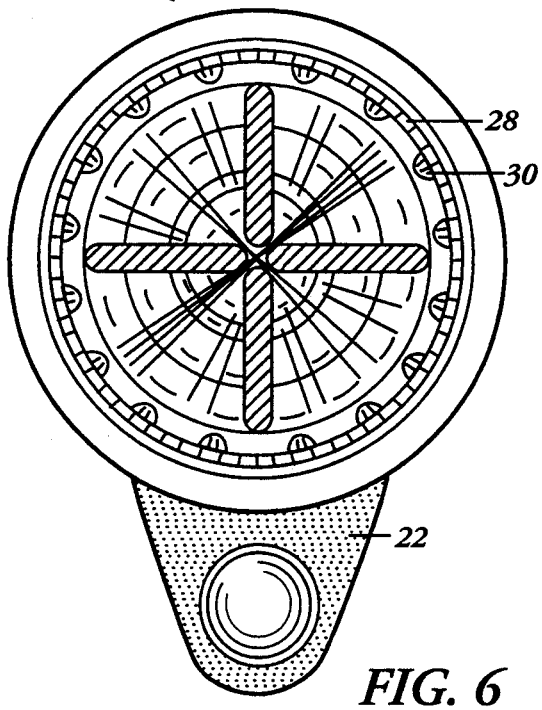
FIG. 6 shows a top view of the container taken along the lines 66 of FIG. 1.
Figure 7:
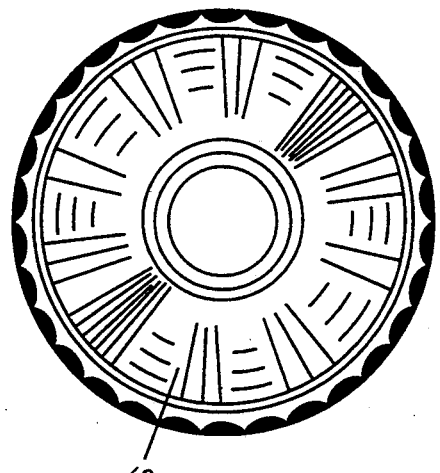
FIG. 7 shows a top view of the lid with the bottle in place.
Figure 5:
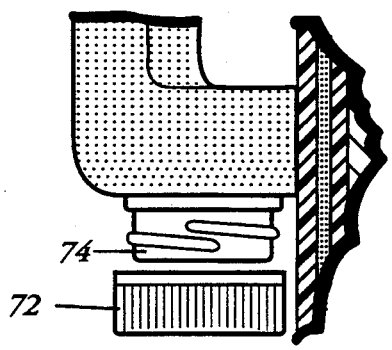
FIG. 5 shows a side view in partial cross section of the storage stump for the cover.

As can be seen from FIG. 6, the ribs 30 run parallel to the length of the chamber 16 and extend radially into the chamber 16. By extending radially into the chamber 16, the ribs prevent a vacuum from being created when a bottle 54 is inserted into the chamber 16. This makes it easier to insert the bottle 54 into the chamber 16 and to remove it once the contents of the bottle 24 have been spent.

Having described the preferred embodiment of my invention, including the specification of preferred dimensions, the scope of the invention is limited only by the claims as herein set forth.

What I claim is:

1. A cooler for beverages designed to receive beverages directly or in a bottle, the cooler including a container and a lid, the container including an elongated chamber with a closed bottom and an open top and a lip integral with the open top, the lid including a rim and a dome with a hole in the apex thereof, mating engagement means on said lip and said rim whereby the lid can be attached to said container and removed therefrom, a pouring spout, said pouring spout having a passage therethrough, second mating engagement means on said pouring spout and on said lid whereby said pouring spout can be attached to said lid at said hole and removed therefrom, said container including a handle and means on said handle to matingly engage said pouring spout when said spout is removed from said lid, and said container including an annular pocket filled with freeze gel.

2. A cooler as described in claim 1 including ribs extending longitudinally in said chamber and projecting radially into such chamber.

3. A cooler as described in claim 1 wherein the container includes a second annular pocket filled with insulated foam.

4. A cooler as described in claim 3 wherein the first annular pocket is inside the second annular pocket.

5. A cooler as described in claim 4 wherein the annular pockets are formed by annular walls, including an inner annular wall, an outer annular wall and an intermediate divider annular wall.

6. A cooler as described in claim 1 wherein said pouring spout includes a plug and a spout with the plug being shaped to fit within and mate with the hole in the lid.

7. A cooler as described in claim 6 wherein the plug and the hole have engagement means to allow the plug to be connected to the lid within the hole and to be removed therefrom and when connected to the lid, the spout extends above the dome of the lid.

8. A cooler as described in claim 1 further including a cover for said pouring spout when said pouring spout is matingly engaged with said handle.

9. A cooler as described in claim 8 further including a stump on said handle and means on said stump enabling it to matingly engage with said cover when said cover it is removed from said pouring spout.

10. A cooler as described in claim 1 wherein the first and second mating engagement means or mating screw threads.

11. A cooler as described in claim 1 wherein the closed bottom of the chamber is concavely shaped when viewed from inside the chambers.

12. A cooler as described in claim 1 wherein the bottom of the container is concavely shaped when viewed from outside the chamber.

13. A cooler as described in claim 1 wherein the closed bottom of the container includes a pocket filled with freeze gel.

14. A cooler as described in claim 13 wherein the bottom of the container includes a second pocket filled with insulating foam.

* * * * *